US012409575B2

(12) United States Patent
Venturini et al.

(10) Patent No.: US 12,409,575 B2
(45) Date of Patent: Sep. 9, 2025

(54) KNIFE FOR CUTTING CAPS

(71) Applicant: SACMI COOPERATIVA MECCANICI IMOLA SOCIETA' COOPERATIVA, Imola (IT)

(72) Inventors: Matteo Venturini, Imola (IT); Davide Penazzi, Imola (IT)

(73) Assignee: SACMI COOPERATIVA MECCANICI IMOLA SOCIETA' COOPERATIVA (IT)

( * ) Notice: Subject to any disclaimer, the term of this patent is extended or adjusted under 35 U.S.C. 154(b) by 0 days.

(21) Appl. No.: 17/451,007

(22) Filed: Oct. 15, 2021

(65) Prior Publication Data

US 2022/0126472 A1 Apr. 28, 2022

(30) Foreign Application Priority Data

Oct. 16, 2020 (IT) ........................ 102020000024511

(51) Int. Cl.
*B26D 1/02* (2006.01)
*B26F 1/44* (2006.01)

(52) U.S. Cl.
CPC .................. *B26D 1/02* (2013.01); *B26F 1/44* (2013.01); *B26F 2210/04* (2013.01)

(58) Field of Classification Search
CPC .. B65D 41/3428; B65D 2401/30; B26D 1/03; B26D 3/11; B26D 1/0006; B26D 7/06
See application file for complete search history.

(56) References Cited

U.S. PATENT DOCUMENTS

| | | | | |
|---|---|---|---|---|
| 6,817,276 | B1 * | 11/2004 | Kowal | B26F 1/20 83/881 |
| 2007/0089587 | A1 * | 4/2007 | Liao | B26F 1/18 83/879 |
| 2018/0370701 | A1 * | 12/2018 | Maguire | B65D 55/16 |
| 2020/0384714 | A1 * | 12/2020 | Migas | B65D 41/3428 |
| 2021/0300634 | A1 * | 9/2021 | Maguire | B26F 1/18 |
| 2024/0025070 | A1 * | 1/2024 | Larivée | B65D 55/16 |

FOREIGN PATENT DOCUMENTS

| | | | | | |
|---|---|---|---|---|---|
| CA | 1161611 | A | | 2/1984 | |
| CN | 105710095 | A | * | 6/2016 | |
| CN | 107755718 | A | * | 3/2018 | B23B 27/00 |
| JP | 2015188974 | A | * | 11/2015 | |
| WO | 2004004993 | A1 | | 1/2004 | |

* cited by examiner

*Primary Examiner* — Jennifer S Matthews
(74) *Attorney, Agent, or Firm* — LAUBSCHER & FRETWELL, P.C.

(57) ABSTRACT

A knife is arranged for a cutting apparatus is provided for obtaining incision lines and notches on a side wall of a plastic cap intended for closing a container when the cap is rotated around its own rotation axis and moved along a path for interacting with the knife in an advancement direction. The knife includes an integral arrangement of cutting edges that project from a peripheral region of the knife and includes an opening formation part for making at least one circumferential notch on the side wall at a first height on a vertical axis that is substantially parallel to the rotation axis to define a tamper-evident ring and a main body in the cap and at least one connection formation part for making at least one notch on the side wall to determine at least one connection portion connecting the tamper-evident ring and the main body.

7 Claims, 10 Drawing Sheets

KNIFE FOR CUTTING CAPS

CROSS-REFERENCE TO RELATED APPLICATION

This application claims priority of IT102020000024511 filed on Oct. 16, 2020, the entire contents of which is incorporated herein by reference.

BACKGROUND OF THE INVENTION

The invention relates to a knife for cutting caps or closures or stoppers made of plastics of the type used for closing containers such as bottles. In particular, the invention relates to a knife arranged for cutting the side wall of a cap, so as to obtain on such side wall a tamper-evident band or ring and one or more connection portions, also known as straps or hinges, which connect the tamper-evident band or ring to a different portion of the cap, for instance to the main body of the cap, i.e., to a portion of the side wall having a closed end of the cap.

The knife may be also arranged for cutting the side wall of the cap so as to obtain, on the main body of the cap, a tab, i.e., a portion of the main body shaped to keep the closure in a pre-set position relative to the tamper-evident ring, after the container has been opened, so as to ease access to the container by a user.

The design of articles made of plastic material is increasingly more oriented towards recyclable materials and recycling articles after use. Due to this, closures provided with straps, that enable to retain the closure on tamper-evident ring thereof even after the container has been opened, are increasingly more requested even in the field of closures for containers.

In the use, when a cap provided with a tamper-evident band and straps is applied to a container mouth, such as a bottle, for closing the container, the tamper-evident band is placed in a seat generally defined between two annular protrusions, which the container body is provided with, that limit the axial movements of the tamper-evident ring. By unscrewing the closure, the container is opened, the tamper-evident band is kept in its seat and the straps keep the cap joined to the tamper-evident ring, and thus to the bottle, even after the closed end portion of the closure has been moved away from the container mouth. The tab is in particular shaped to keep the closed end portion of the closure in a position, in particular in a position overturned with respect to the tamper-evident ring or to the container mouth, such as to make the container mouth easily accessible by a user.

This contributes to an effective recycling of plastics, as the tamper-evident ring may be separated from the bottle together with the closure at the same time, namely when the closure plastic material is intended to be recycled. Furthermore, keeping the closure connected to the tamper-evident ring even after opening the container helps preventing the cap from being dispersed into the environment.

The straps on the side wall of a cap are mainly obtained according to two types of processing: by forming, i.e., providing moulds which are duly shaped to form straps; or by cutting, i.e., providing a cuts and incisions arrangement on the side wall of the cap already formed. Cuts and incisions determine side wall parts that are partially detachable from the remaining side wall of the cap, such side wall parts defining the connection portions or straps in addition to the tamper-evident ring and the tab. Techniques for producing straps combining particular shapes of mould for forming the cap and determined shapes of notches obtained on the caps after forming are also known.

They are known cutting devices including blades suitable for cutting or making incisions on a cap in the side wall thereof in order to determine a circumferential weakening and a preferential separation line between the tamper-evident band and a remaining part of the side wall of the cap, i.e., of the main body. This type of cut is also known as horizontal cut.

They are also known cutting devices suitable for cutting and making incisions, in one or more points or zones, on a side wall of the cap according to a direction substantially parallel to the axis of the cap, in order to obtain, for example, weakening zones in the tamper-evident band. This type of cut is also known as vertical cut.

They are also known cutting devices suitable for making incisions on a side wall both by a horizontal cut and a vertical cut in a radial position of the cap. These last cutting devices generally include a knife for horizontal cut, downstream of which an insert provided with a vertical blade is positioned to make incisions on the cap by a vertical cut.

They are also known cutting devices having knives which include a plurality of blades to obtain the connection portions or straps and a tab.

The different cutting devices described above are provided with knives manufactured for specific cutting geometries and for specific cap sizes. As the complexity of the specific cutting geometries increases, cutting devices appear as a combination of more parts or blades assembled between them. This implies that the cap manufacturer has to find and keep stored several blades which the cutting device is to be equipped with any time that the cap production batch needs to be changed. Furthermore, equipping the cutting device with a new blade requires a given machine downtime, as such blade must firstly be assembled in its parts and then assembled on a cutting apparatus, this involving high production costs. Furthermore, the knives used to obtain the straps and the tabs are structurally complex, requiring a large number of parts to be replaced once worn, consequently, manufacturing caps by means of such complex structures increases production costs. Furthermore, the assembly configurations of such parts are time-consuming and require high precision in the relative positioning of the parts between them such that the notches are continuously made on the wall of the cap. The wrong positioning of the parts between them and/or the relative displacement of the parts between them in the use imply low-quality notches with consequent yield reduction of the cutting device and increase of wastes.

SUMMARY OF THE INVENTION

An object of the invention is to improve the knives of the prior art for apparatuses for cutting caps.

Another object of the invention is to provide an alternative solution for making incisions on caps.

A further object of the invention is to provide a knife for an apparatus for cutting caps making incisions of straps or other elements such as tabs on side walls of plastic caps and that has a relatively simple structure.

According to the invention, it is provided a knife as defined by the enclosed claims.

Owing to the invention it is possible to provide a knife made in a single piece which makes incisions having a more or less complex geometry by means of cutting profiles, in particular continuously connectable, arranged according to different tilts.

Owing to the invention it is possible to provide a knife that is robust, compact and stable in use.

BRIEF DESCRIPTION OF THE DRAWINGS

The invention shall be better understood and implemented referring to the appended drawings which show some exemplary and non-limiting embodiments thereof, wherein.

DETAILED DESCRIPTION

Figure 1:
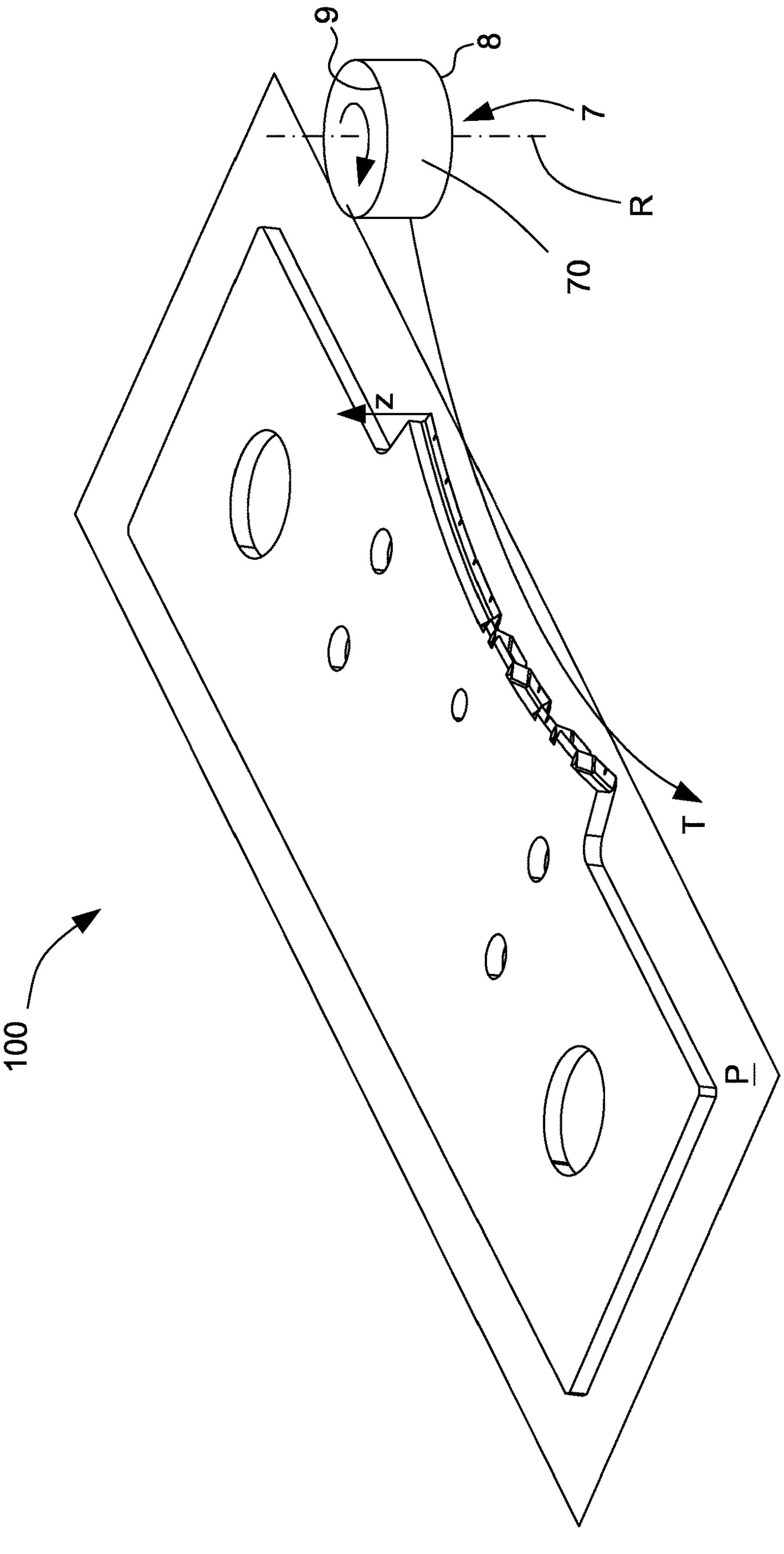
FIG. 1 is a perspective view of a first embodiment of a knife for cutting caps.

Referring to FIGS. 1-3, 4A, 4B, 5, 6A, 6B, 6C, 6D, 6E, 6F and 6G, one first embodiment of a knife for cutting capsules or caps or closures, i.e., a knife 100 arranged for cutting or making incisions on a side wall 70 of a cap 7 is disclosed. The cap 7 is made of plastic material and is intended to close a container, such as a bottle. The cap 7 has a cup-shaped main body 71 and is provided with a closed end 8 and an open end 9.

The knife 100 is arranged to be mounted in a cutting apparatus to obtain incision lines and notches on the cap 7.

The word "cut" or "notch" means a zone of the cap 7 provided with a piercing cut, i.e., a through slit where the material continuity has been interrupted by the action of the knife. The word "incision" means a zone of the cap 7 in which the side wall 70 has a small thickness caused by a knife penetrating the material up to a given depth without interrupting the material continuity. Based on the thickness of the wall of the cap, an equal action of the knife, i.e., an equal depth of penetration of the knife may create a cut where the penetration depth is equal to or greater than the thickness of the wall or an incision where the same depth of penetration is smaller than the thickness of the wall.

The knife 100 includes at least a cutting protrusion, arranged to interact with a wall of the cap 7 to produce notches or incisions thereon. In particular, the knife 100 includes a plurality of cutting protrusions, such as a first cutting protrusion, a second cutting protrusion, a third cutting protrusion and a fourth cutting protrusion. The knife 100 has a plate structure made in a single piece in which the cutting protrusions are obtained defining a cutting portion of the knife 100, hereinafter indicated as an arrangement of cutting edges 60. In the present disclosure, arrangement of cutting edges means an arrangement or assembly of cutting edges having different shapes and sizes which the knife is provided with, which enable the knife to perform cuts and/or incisions on the cap 7 when the knife 100 is mounted in a cutting apparatus for cutting and making notches on caps.

Referring to FIGS. 7-9, 10A and 10B, a second embodiment of the knife, i.e., a knife 100', is shown. The knife 100' has a plate structure made in a single piece in which the cutting edges have a different tilt with respect to those of the knife 100. Such a structure defines a cutting portion of the knife 100', i.e., an arrangement of cutting edges 60'.

Figure 4A:
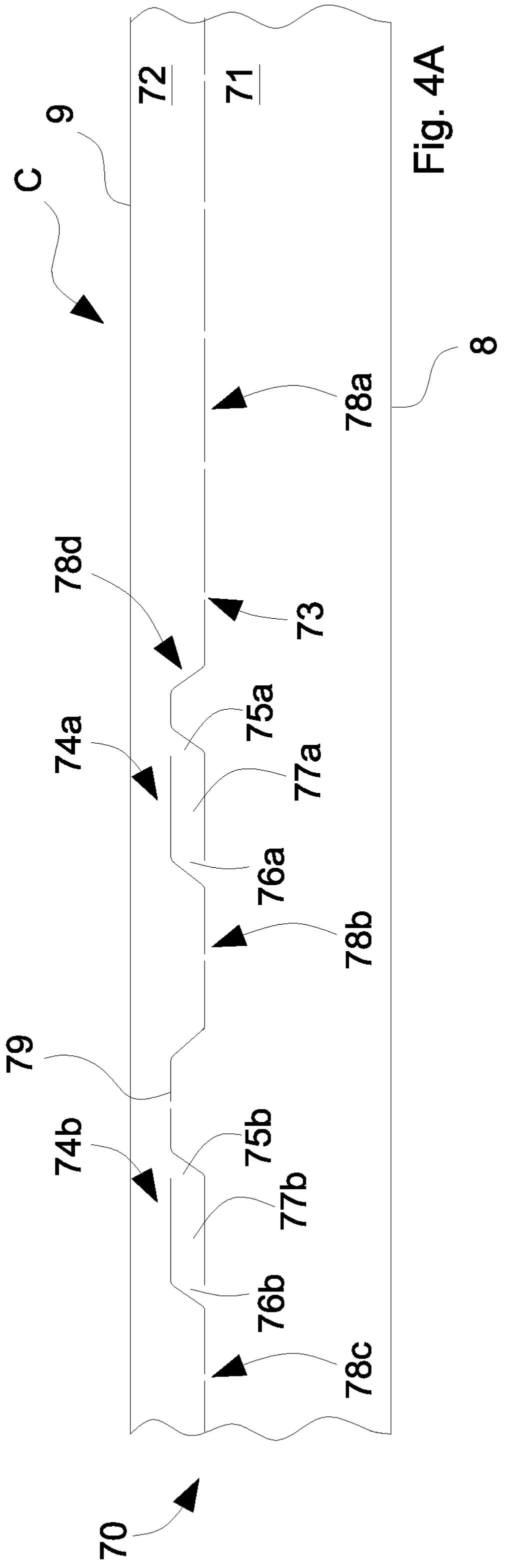
FIG. 4A is a view in a cylindrical projection of a side wall of a cap cut by the knife of FIG. 1, in a closing configuration of the cap.
Figure 4B:
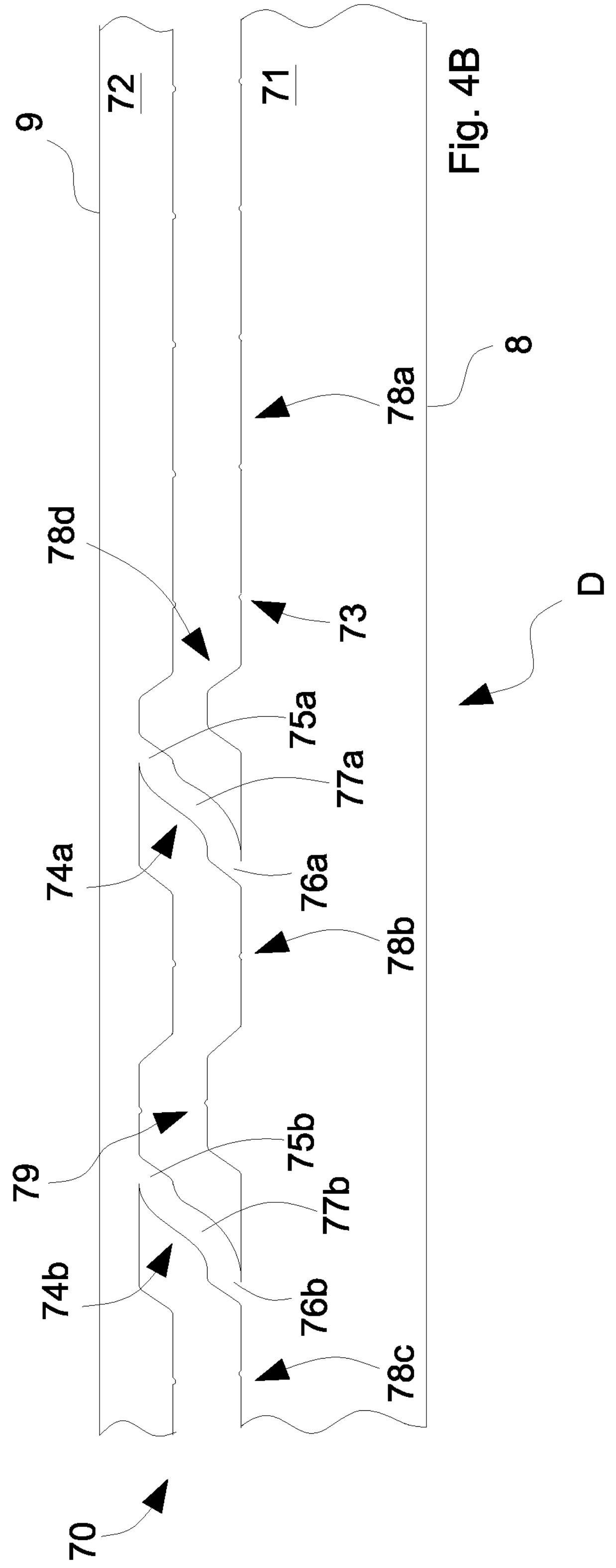
FIG. 4B is a view in a cylindrical projection of a side wall of a cap cut by the knife of FIG. 1, in an opening configuration of the cap.
Figure 10A:
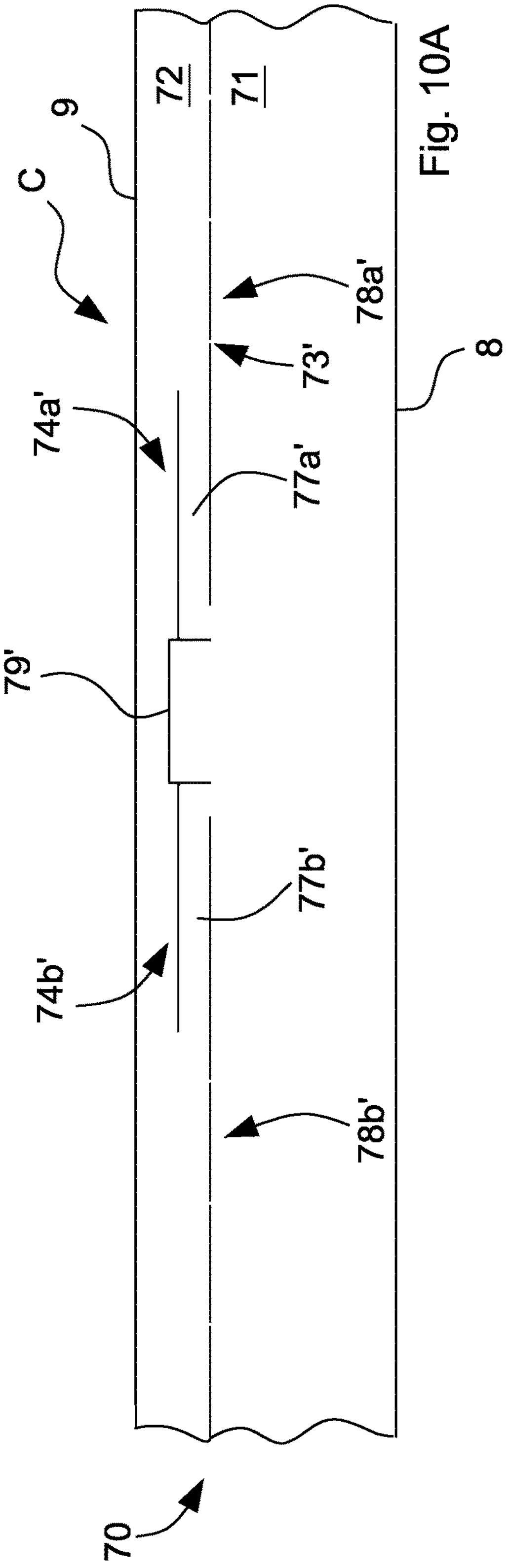
FIG. 10A is a view in a cylindrical projection of a side wall of a cap cut by the knife of FIG. 7, in a closing configuration of the cap.
Figure 10B:
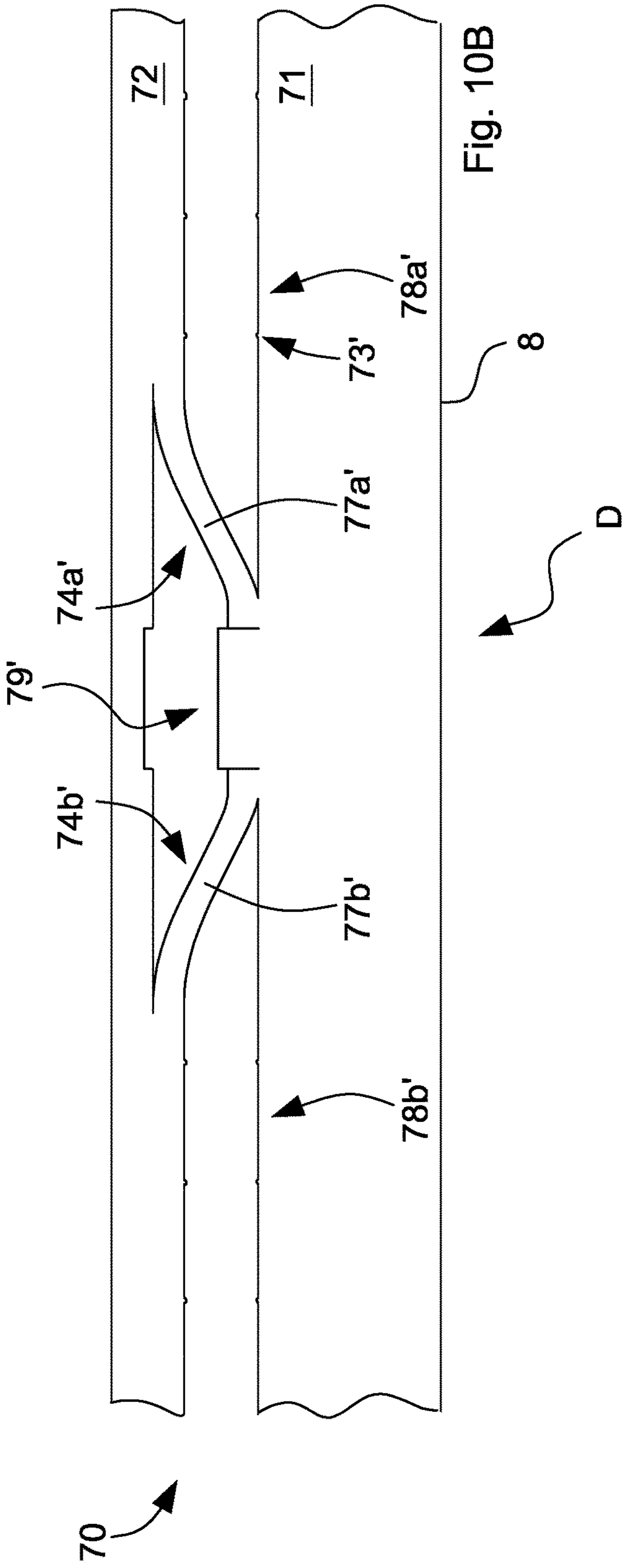
FIG. 10B is a view in a cylindrical projection of a side wall of a cap cut by the knife of FIG. 7, in an opening configuration of the cap.

The knife 100, 100' is suitable for forming a tamper-evident band or ring 72 in the cap 7 (FIG. 4A, 4B, 10A, 10B). The knife 100, 100' is suitable for forming connection portions 74*a*, 74*b* between the tamper-evident ring 72 and the main body 71. By means of the connection portions 74*a*, 74*b*, the main body 71 of the cap 7 remains connected to the tamper-evident ring 72 even when the cap 7 is removed from a container mouth on which it had been applied to open the container and have access to the content, i.e., when the cap is in an opening configuration D (FIG. 4B, 10B).

The knife 100, 100' is also suitable for forming tab portions 79, 79' in the side wall 70 on the main body 71 of the cap 7. The tab portions 79, 79' allow to hold the main body 71 of the cap 7 in an overturned position on the container mouth. When the cap is in the opening configuration D, given the presence of the straps 74*a*, 74*b*, 74*a'*, 74*b'* connecting the tamper-evident ring 72 and the main body 71, the main body 71 remains lifted at the container mouth obstructing the container mouth despite being detached therefrom; in order to clear the container mouth from the main body 71 volume and have easy access to the container mouth on which the cap 7 was applied, it may be necessary to overturn the main body 71 relative to the tamper-evident ring 72; once the main body 71 has been overturned, due to an elasticity of the straps, it is possible that the main body 71, if not retained, returns to a configuration close to the opening D. By means of the tab portion 79, 79' it is possible to hold stably the main body 71 in an overturned configuration (not shown) relative to the tamper-evident ring 72, being the tab portion 79, 79' shaped to abut on a body-retaining element placed in particular on the main body 71 or on the container mouth.

The knife 100, 100' inside the cutting apparatus cooperates with a rotating spindle (not shown) which grabs the cap 7 rotating it about a rotation axis R parallel to, or coincident with, an axis of the cap 7. The rotating spindle leads the side wall 70 of the cap 7 to contact with a cutting portion of the knife 100, 100', moving the cap 7 along a substantially arc-of-circumference-shaped path in an advancement direction T and rotating the cap 7 on the rotation axis R, rolling the cap against the cutting portion of the knife 100, 100'. As known, a possible sliding of the cap with respect to the spindle or the cutting portion is undesired.

Based on the arrangement of cutting edges 60, 60' of the cutting portion of the knife 100, 100', a corresponding incision on the side wall 70 of the cap is obtained. In other words, such an arrangement of cutting edges 60, 60' is translated into a recess on the side wall 70 of a cap 7.

Figure 7:
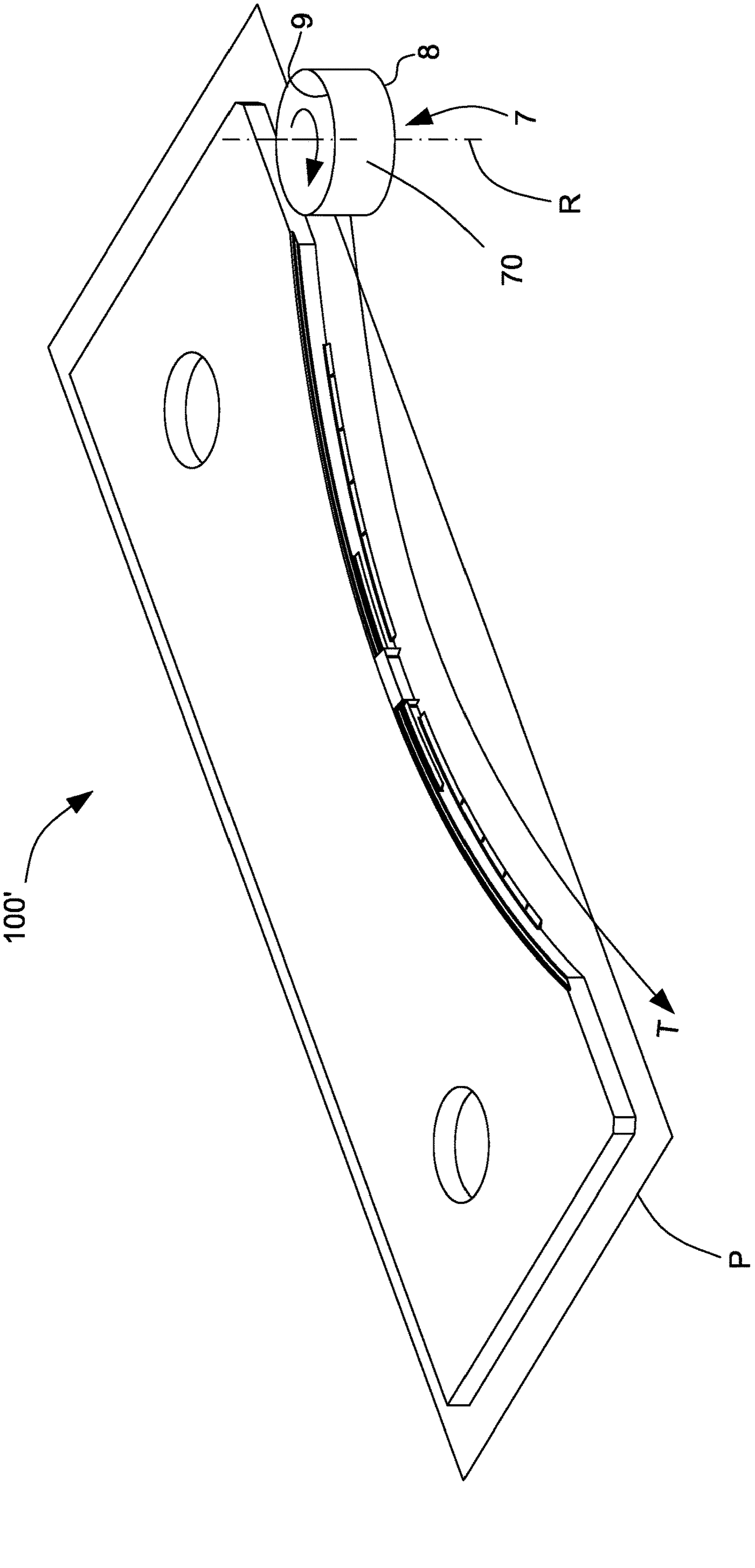
FIG. 7 is a perspective view of a second embodiment of a knife for cutting caps.

Referring to FIGS. 1 and 7, it must be noted that the advancement direction T and the rotation R direction of the cap 7 are only explanatory and the effect of the knife 100, 100' on the cap 7 is the same as that obtainable inverting both the advancement direction T and the rotation R direction.

Referring to FIGS. 3, 9, 4B, 10B the arrangement of the cutting edges 60, 60' defines in the side wall 70, after the action of cutting and making incisions, the main body 71 and the tamper-evident band or ring 72. In this disclosure the term "main body" is associated with the portion of the side wall 70 having the closed end 8, while the phrase "tamper-evident band" or "tamper-evident ring" is associated with the portion of the side wall 70 having the open end 9, substantially annular-shaped.

The main body 71 and the tamper-evident band 72 are connected to each other by a plurality of connection portions or straps 74*a*, 74*b* and by a plurality of bridges 73, i.e., elements made of plastic material intended to be fractured by the user upon opening for the first time the container on which the cap 7 is applied, to give evidence of the tampering of the container closure.

Referring in particular to FIGS. 4A and 10A, the cap 7, the side wall 70 of which is shown on a representation plane, has a closing configuration C where the bridges 73, 73' are integral and contribute with the straps 74*a*, 74*b*, 74*a'*, 75*b'* to join the tamper-evident band 72 to the main body 71. The closing configuration C is taken by the cap before being applied to a container or after being applied and before the container is opened for the first time and the cap is actuated.

Referring in particular to FIGS. 4B and 10B, the cap 7, the side wall 70 of which is shown on a representation plane, has an opening configuration D wherein the bridges 73, 73' are broken, the main body 71 is spaced apart from the tamper-evident band 72 and the tamper-evident band 72 is connected to the main body 71 only by the straps 74*a*, 74*b*, 74*a'*, 74*b'*. The opening configuration D is taken by the cap applied to a container and after opening the container from which the cap is moved away for the first time.

Figure 2:
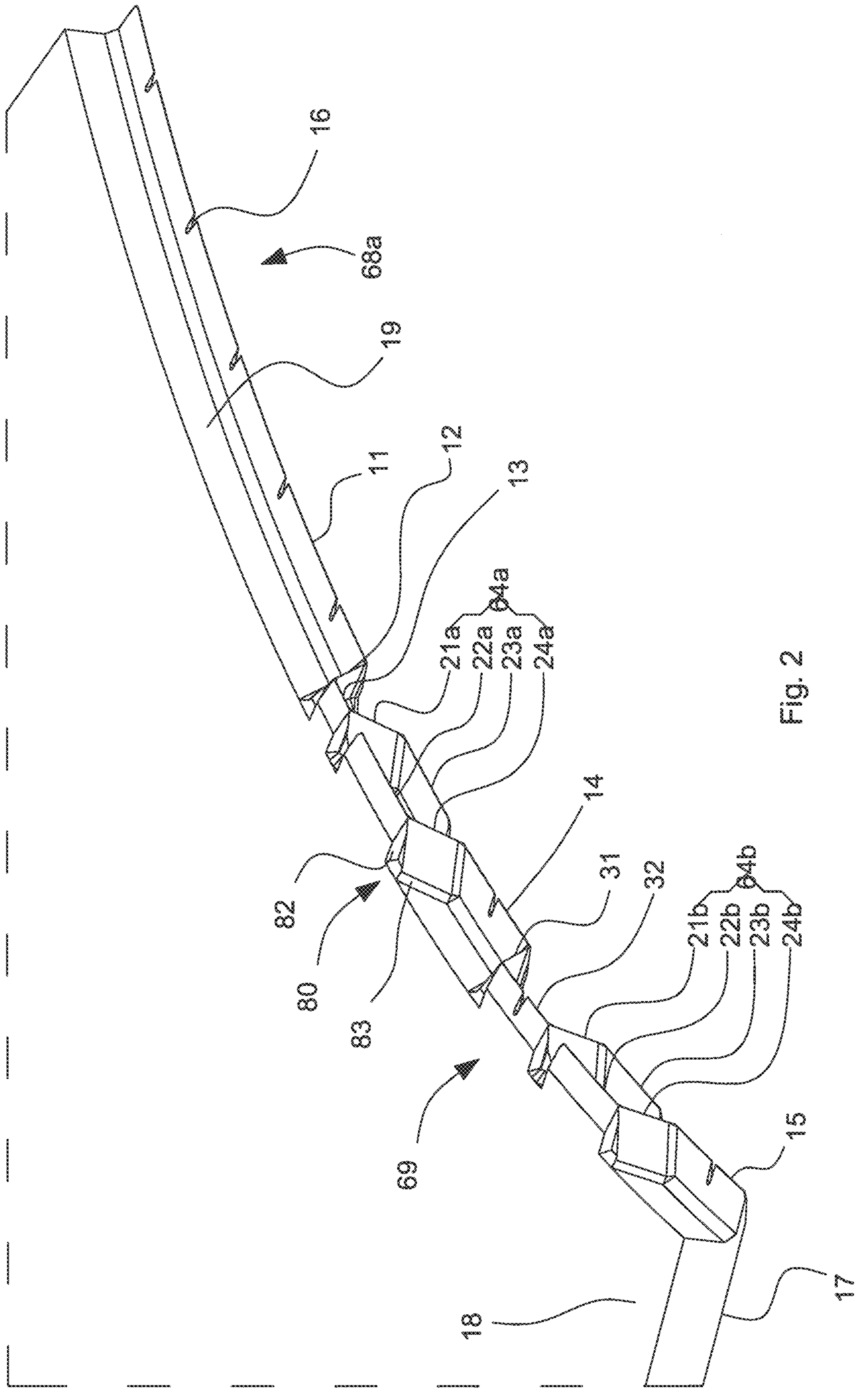
FIG. 2 is a detail of FIG. 1, showing cutting protrusions of the knife.
Figure 5:
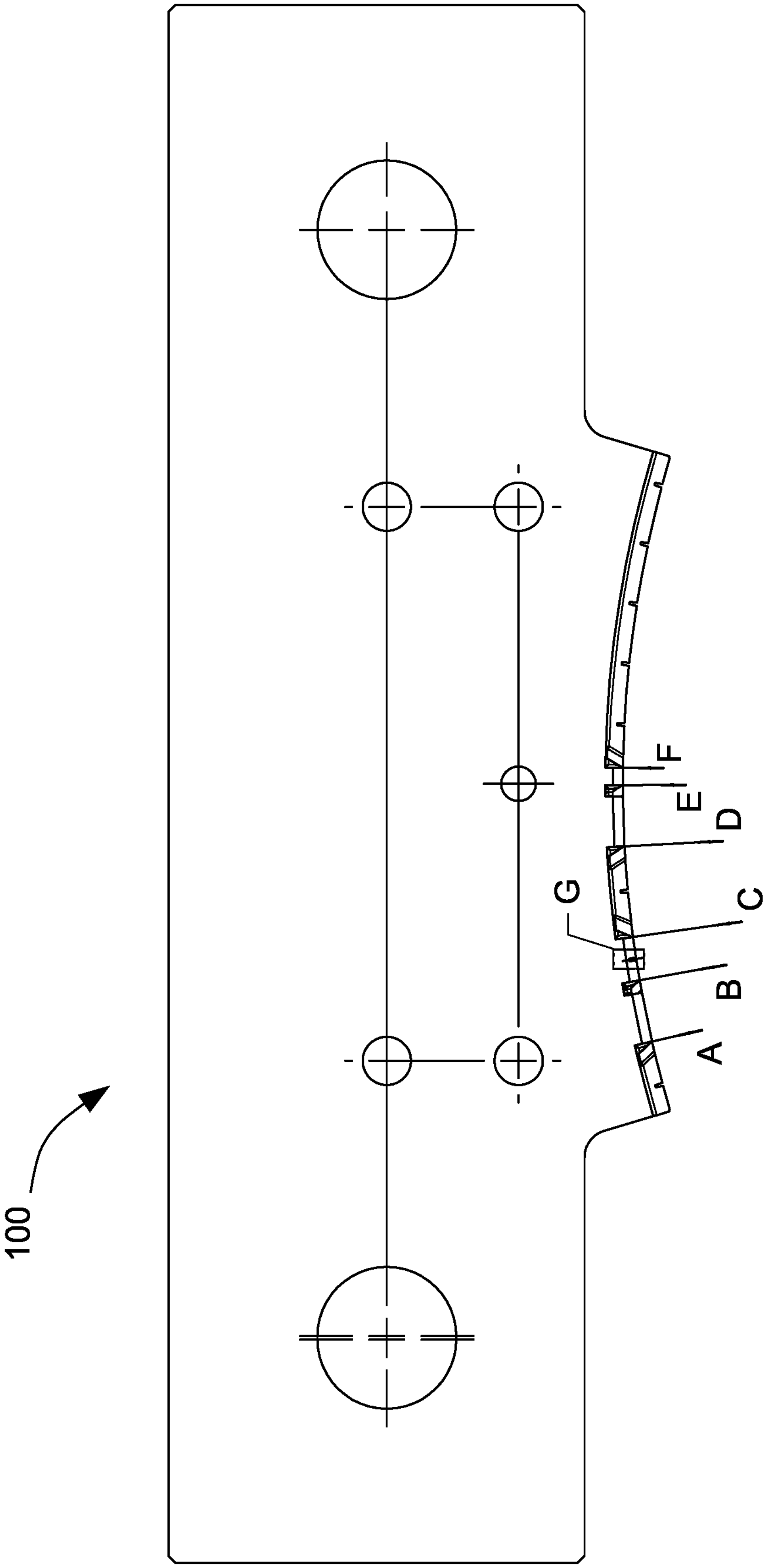
FIG. 5 is a plan view of the blade of FIG. 1.

Referring to the FIGS. 1, 2 and 5, the knife 100 has, in particular, a plate structure shape, i.e., it extends mainly along two main dimensions with respect to a third transversal dimension (thickness), and has plan shape which is in particular rectangle like (FIG. 5). The main dimensions may in particular lie on the plane P, the transversal dimension may lie in particular along a vertical axis Z and substantially orthogonal to plane P. The axis Z is in particular substantially parallel to the rotation axis R of the cap 7. The knife 100 has two plane faces, substantially parallel to each other and to the plane P; a lower face 17 and an upper face 18.

The cutting protrusions of the knife 100, 100' include in particular a plurality of blades. Each blade of the plurality of blades includes a root, or proximal end, by which it is connected to a peripheral region 19, 19' of the knife 100, 100' and a cutting edge, or distal end, arranged for making incisions or notches on the side wall 70 of the cap 7. The arrangement of cutting edges 60, 60' projects from that peripheral region 19, 19' and is facing, in use, the rotation axis R, i.e., the cap 7.

The blades may include in particular one or more notches 16, 16' arranged for forming the bridges 73, 73'. Such notches 16, 16' are suitably spaced apart and sized in such a way as not to interrupt the continuity of the material, for example not to locally affect or to make incisions without piercing the side wall 70 of the cap, in order to form bridges 73, 73'.

The knife 100, in the peripheral region 19, includes in particular a first cutting protrusion which extends parallel to the horizontal plane P. Such first cutting protrusion is arranged in particular for making circumferential notches on the side wall 70 at a first height on the vertical axis Z to define a tamper-evident ring 72 in the cap 7.

The first cutting protrusion includes in particular a plurality of first cutting edges 11, 14, 15, 23*a*, 23*b*, such first cutting edges 11, 14, 15, 23*a*, 23*b*, may be in particular spaced apart from each other along the advancement direction T.

The first cutting edges 11, 14, 15, 23*a*, 23*b*, may lie on a same plane that is parallel to the plane P, therefore the first protrusion acts as a horizontal cutting tool. The first plane is at a given height with respect to the plane P, on the vertical axis Z, orthogonal to the plane P. Joining the plurality of the first cutting edges 11, 14, 15, 23*a*, 23*b*, a first substantially arc-of-circumference curved line is obtained, the centre of which is positioned outside the knife 100, 100' on an axis substantially orthogonal to the plane P. The first cutting protrusion is arranged in particular to contribute to form straps 74*a*, 74*b* on the side wall 70, together with the second cutting protrusion and third cutting protrusion, and makes the incisions and cuts that separate the main body 71 from the tamper-evident band 72.

The knife 100, in the peripheral region 19, includes in particular a second cutting protrusion which extends parallel to the horizontal plane P. Such second cutting protrusion overlaps in particular at least partially the first cutting protrusion for one or more tracts of a pre-set length measured along the advancement direction T. Such second cutting protrusion is arranged in particular for making circumferential notches on the side wall 70 at a second height on the vertical axis Z and to determine, in use, together with the first cutting protrusion, the connection portions connecting the tamper-evident ring 72 and the main body 71.

The second cutting edge includes in particular a plurality of second cutting edges 13, 22*a*, 22*b*, such second cutting edges 13, 22*a*, 22*b*, may be in particular spaced apart from each other along the advancement direction T.

The second cutting edges 13, 22*a*, 22*b* lie on a same second plane that is parallel to the plane P, therefore the second protrusion acts as a horizontal cutting tool. Joining the plurality of the second cutting edges 13, 22*a*, 22*b*, a second substantially arc-of-circumference curved line is obtained, the centre of which is positioned outside the knife 100, 100' on an axis substantially orthogonal to the plane P. The second cutting protrusion is arranged in particular for contributing to determine, in use, the straps 74*a*, 74*b*, in particular central portions 77*a*, 77*b*, of the straps 74*a*, 74*b*, on the side wall 70, together with the first cutting protrusion.

The knife 100, in the peripheral region 19, includes in particular a third cutting protrusion arranged to make oblique and/or vertical notches on the side wall 70. Such third cutting protrusion is in particular arranged for contributing to determine, in use, together with the first cutting protrusion and/or second cutting protrusion, the straps 74*a*, 74*b*, in particular joint portions 75*a*, 75*b*, 76*a*, 76*b*, of the straps 74*a*, 74*b* and a tab portion 79 on the side wall 70.

The third cutting edge includes in particular a plurality of third cutting edges 12, 21*a*, 21*b*, 24*a*, 24*b*, 31, such third cutting edges 12, 21*a*, 21*b*, 24*a*, 24*b*, 31, may be in particular spaced apart from each other along the advancement direction T.

The third cutting protrusion is arranged for making oblique notches on the side wall 70. The third cutting protrusion may include at least a third tilted edge 21*a*, 21*b*, 24*a*, 24*b* having a tilt opposite to at least a third tilted cutting edge 12, 31. Within this context the tilt refers to a reference plane passing through the vertical axis Z and tangent to the advancement direction T.

Figure 6A:
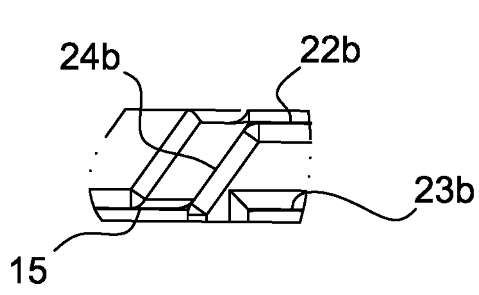
FIG. 6A is a first detailed view of FIG. 5.
Figure 6B:
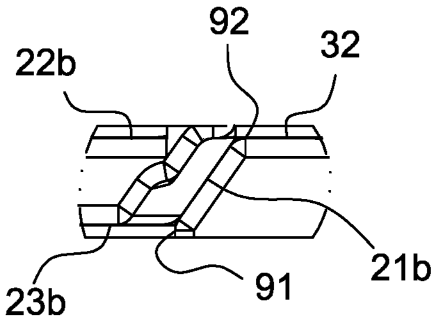
FIG. 6B is a second detailed view of FIG. 5.

Referring in particular to the specific embodiment of the knife 100, the third tilted cutting edges 21*a*, 21*b*, 24*a*, 24*b* have a negative tilt and the third tilted cutting edges 12, 31 have a positive tilt. The negative tilt corresponds to a cutting edge having an upper end thereof that is retracted with respect to a lower end thereof along said advancement direction T, and vice versa, said positive tilt corresponds to a cutting edge having an upper end thereof that is advanced with respect to a lower end thereof along said advancement direction T. Referring to FIG. 6B, for instance, the third cutting edge 21*b* includes an upper end 92 thereof and a lower end 91 thereof and, considering the advancement direction T, the upper end 92 is retracted with respect to the lower end 91, therefore the third cutting edge 21*b* has a negative tilt. Similarly, referring to FIG. 6C, for example, the third cutting edge 31 includes an upper end 94 thereof and a lower end 93 thereof and, considering the advancement direction T, the upper end 94 is more advanced with respect to the lower end 93, therefore the third cutting edge 31 has a positive tilt.

The third cutting protrusion may include in particular one or more third vertical blades with respective vertical cutting edges.

Therefore, with respect to the Cartesian plane formed by the vertical axis Z orthogonal to the plane P and by an axis substantially oriented as the advancement direction T, originating in any point of the advancement direction T, the tilted cutting edges may be oriented on the peripheral region 19 in the following alternative ways:

- with a negative tilt, such as the third cutting edges with negative tilt 21*a*, 21*b*, 24*a*, 24*b;*
- with a positive tilt, such as the third cutting edges with positive tilt 12, 31;
- vertically (not shown), i.e., parallel to the vertical axis Z.

The peripheral region 19, 19' of the knife 100, 100', defines a third substantially arc-of-circumference curve lying in a third plane, the centre of the circumference is positioned outside the knife 100, 100' on a third axis substantially orthogonal to the plane P. The peripheral region 19 defines, in addition, the surface of the knife 100, 100', against which the side wall 70 of the cap 7 may be rotated on the rotation axis R thereof while the knife 100, 100' makes the incisions and cuts on the side wall 70. In other words, the third curve defined by the peripheral region 19, 19' contributes to guide the cap 7 along its interaction path with the knife 100, 100' in the advancement direction T.

The third cutting protrusion is arranged in particular for forming oblique notches on the side wall 70 of the cap 7, where oblique notches also include vertical notches.

Figure 3:
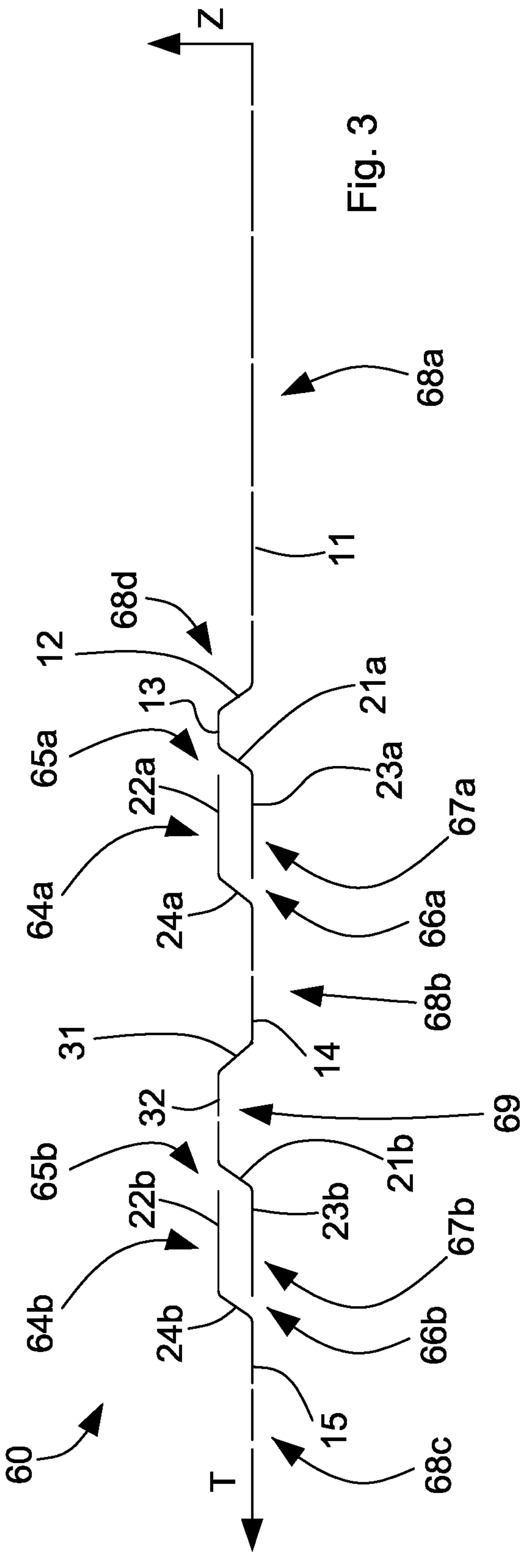
FIG. 3 is a schematic view of the blade arrangement of the knife of FIG. 1.

Referring to FIGS. 1-3, the knife 100, in the peripheral region 19, includes in particular a fourth cutting protrusion which extends parallel to the horizontal plane P. Such fourth cutting protrusion is arranged in particular for making circumferential notches on the side wall 70 at a third height on the vertical axis Z and to determine, in use, together with the third cutting protrusion, the tab portion 79 on the side wall 70.

The fourth cutting protrusion includes in particular a fourth cutting edge 32 which is horizontal. The fourth cutting edge 32, or at least one point thereof, is on a fourth substantially arc-of-circumference curve, the centre of which is positioned outside the knife 100, on a fourth axis substantially orthogonal to the plane P. The fourth curve, and thus the fourth cutting edge 32, lies on a third plane at a height equal to or greater than the second cutting edges 22*a*, 22*b*. The fourth cutting edge 32 has a longitudinal extension smaller than the circumference of the side wall 70 of the cap to be processed.

The fourth cutting edge 32 may lie at a different height, measured on the vertical axis Z, for instance higher than a height on which the second cutting edges 13, 22*a*, 22*b* lie. Referring specifically to the embodiment of the knife 100, the second cutting edges and the fourth cutting edge are at the same height, in other words the third height of the fourth cutting protrusion and the second height of the second cutting protrusion coincide, therefore the second and fourth plane also coincide.

In the knife 100, moreover:

- the first axis of the first curve defined by the first cutting edges 11, 23*a*, 23*b*, 14, 15 of the first cutting protrusion;
- the second axis of the second curve defined by the second cutting edges 13, 22*a*, 22*b*, of the second cutting protrusion;
- the third axis of the third curve defined by the peripheral region 19; and
- the fourth axis of the fourth curve defined by the fourth cutting edge 32, are substantially coincident with each other.

In the knife 100, furthermore, the relative position between:

- the first cutting edges 11, 23*a*, 23*b*, 14, 15;
- the second cutting edges 13, 22*a*, 22*b;*
- the third cutting edges with a negative tilt 21*a*, 21*b*, 24*a*, 24*b;*
- the third cutting edges with a positive tilt 12, 31;
- the fourth cutting edge 32;
- defines an arrangement of cutting edges 60 of the knife 100.

The arrangement of cutting edges 60 may include possible third vertical cutting edges orthogonal to the plane P.

As already mentioned, the first cutting edges 11, 23*a*, 23*b*, 14, 15 and the second cutting edges 22*a*, 22*b*, 13 are arranged between each other at different heights along the vertical axis Z, i.e., at different distances from the plane P.

Referring to FIGS. 4A and 4B, depending on the relative position between the cutting edges of the cutting tools, the knife 100 may form on the side wall 70 of the cap 7 different parts.

The knife 100 may form on the side wall 70 in particular one or more intended detachment lines 78*a*, 78*b*, 78*c* arranged on the same plane and obtained by penetrating the first cutting edges 11, 14, 15 through the thickness of the side wall 70.

The knife 100 may form on the side wall 70 in particular one or more connection portions, or straps 74*a* 74*b*. Each strap 74*a*, 74*b* may in turn include in particular a central portion 77*a*, 77*b*, obtained by through penetration of the first cutting edges 23*a*, 23*b* and second cutting edges 22*a*, 22*b*, and a first joint portion 75*a*, 75*b* obtained by through penetration of the third cutting edges with a negative tilt 21*a*, 21*b*, arranged in particular for connecting the connection portion 74*a* to the tamper-evident ring 72. Each strap 74*a*, 74*b* may in turn include in particular a second joint portion 76*a*, 76*b*, obtained by through penetration of the third cutting edges with a negative tilt 24*a*, 24*b*, arranged in particular for connecting the connection portion 74*a* to the main body 71.

Figure 6C:
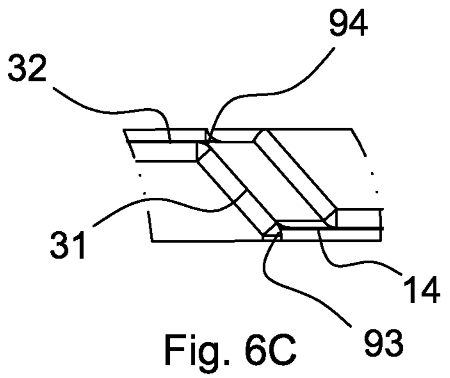
FIG. 6C is a third detailed view of FIG. 5.
Figure 6D:
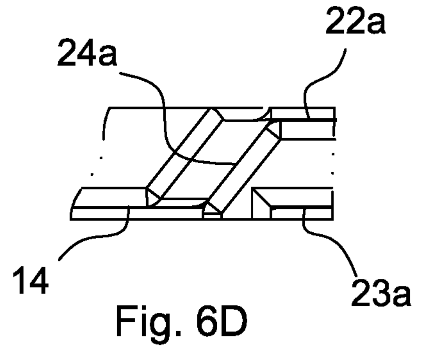
FIG. 6D is a fourth detailed view of FIG. 5.
Figure 6E:
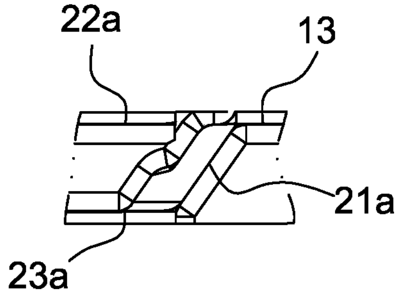
FIG. 6E is a fifth detailed view of FIG. 5.
Figure 6F:
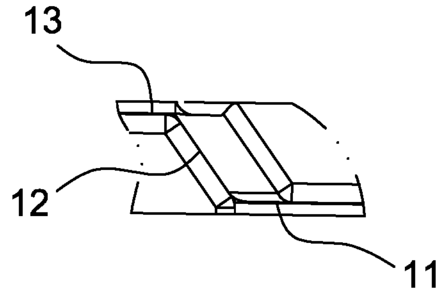
FIG. 6F is a sixth detailed view of FIG. 5.
Figure 6G:
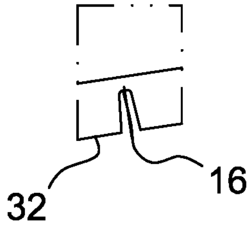
FIG. 6G is a seventh detailed view of FIG. 5.

The knife 100 may in particular form a tab portion 79 on the side wall 70, due to the penetration of the third cutting edge with a negative tilt 21*b*, the fourth cutting edge 32 and the third cutting edge with a positive tilt 31, such tab portion 79 is arranged in particular for maintaining the main body 71 overturned with respect to the tamper-evident ring 72 once the container is open. Still referring to FIGS. 4A and 4B, the knife 100 may form in particular a tooth portion 78*d* on the main body 71 and a corresponding recess on the tamper-evident ring 72, such tooth portion 78*d* being located in particular downstream of the intended detachment line 78*a* and upstream of the strap 74*a*. The tooth portion 78*d* may be obtained in particular from the third cutting edge with a positive tilt 12 and from the second cutting edge 13. The tooth portion 78*d* is arranged in particular for connecting the intended detachment line 78*a* to the first joint portion 75*a*, such that the intended detachment lines 78*a* and 78*b* lie on the same plane, so as to make the open end of the main body 71 even. The tooth portion 78*d* allows to conform the adjoining strap 74*a* so that it has, in use, a more elastic behaviour and therefore less likely to break. In detail, referring to FIG. 3, along the advancement direction T, the knife 100 may include in particular an opening formation part 68*a*, including the first cutting edge 11 lying on the first plane parallel to plane P. The final end of the first cutting edge 11 is connected to the initial end of the third tilted cutting edge 12, in other words the cutting edges 11 and 12 are adjoining between each other (FIG. 6F). The opening formation part 68*a* extends for example for about 50% of the length of the knife 100. The opening formation part 68*a* is matched on the cap 7 by the relative intended detachment line 78*a* (FIG. 4A, 4B). In other words, the opening formation part 68*a* is arranged in particular for making circumferential notches on the side wall 70 at a first height on the vertical axis Z substantially parallel to the rotation axis R to define the tamper-evident ring 72 and the main body 71.

The knife 100 may include in particular a connection formation part 64*a*. The connection formation part 64*a* occupies a region of the knife 100 extending for instance between 10 and 15% of the length of the knife 100. The connection formation part 64*a* corresponds to the strap 74*a* on the cap 7. In other words, the connection formation part 64*a* is arranged in particular for making circumferential notches on the side wall 70 in order to determine, in use, a connection portion or strap 74*a*, connecting the tamper-evident ring 72 and the main body 71. The connection formation part 64*a* may in turn include in particular a connection formation central part 67*a*, in which the second cutting edge 22*a*, lying on the second plane, overlaps the first cutting edge 23*a* along the vertical axis Z, at a height higher than the first cutting edge 23*a*. The connection formation central part 67*a* extends for instance for about 3/5 of the connection formation part 64*a*. The connection formation central part 67*a* is matched by a corresponding central portion of the strap 77*a*.

The connection formation part 64*a* may in turn include in particular a first joint formation part 65*a*, located in particular upstream of the connection formation central part 67*a*, including the third cutting edge 21*a* tilted with a negative tilt. The initial end of the third tilted cutting edge 21*a* is connected to the final end of the second cutting edge 13 and the final end of the third tilted cutting edge 21*a* is connected to the initial end of the first edge 23*a*, in other words the edges 13, 21*a* and 23*a* are adjoining to each other (FIG. 6E). The first joint formation central part 65*a* extends for instance for about 1/5 of the connection formation part 64*a*. The joint formation part 65*a* is matched by the respective joint portion 75*a* on the cap 7. In other words, the first joint formation part 65*a* is arranged in particular for determining in use the joint portion 75*a*.

The connection formation part 64*a* may in turn include in particular a second joint formation part 66*a*, located in particular downstream of the connection formation central part 67*a*, including the third tilted cutting edge 24*a* with a negative tilt. The initial end of the third tilted cutting edge 24*a* is connected to the final end of the second cutting edge 22*a* and the final end of the third tilted cutting edge 24*a* is connected to the initial end of the first cutting edge 14, in other words the cutting edges 22*a*, 24*a* and 14 are adjoining to each other (FIG. 6D). The joint formation part 66*a* extends for instance for about 1/3 of the connection formation part 64*a*. The joint formation part 66*a* is matched by the respective joint portion 76*a* on the cap 7. In other words, the joint formation part 66*a* is arranged in particular for determining in use the joint portion 76*a*.

The knife 100 may include in particular a further opening formation part 68*b*, including the first cutting edge 14 lying on the first plane. The initial end of the first cutting edge 14 is connected to the final end of the third tilted edge 24*a* and the final end of the first cutting edge 14 is connected to the initial end of the third tilted edge 31, in other words the cutting edges 24*a*, 14 and 31 are adjoining to each other (FIGS. 6C and 6D). The further opening formation part 68*b* extends for example for about 10% of the length of the knife 100. The further opening formation part 68*b* is matched by the relative intended detachment line 78*b*.

The knife 100 may in particular include a tab forming part 69, including the third cutting edge with a positive tilt 31, the fourth cutting edge 32 and the third cutting edge with a negative tilt 21*b*. The initial end of the fourth cutting edge 32 is connected to the final end of the third tilted cutting edge 31 and the final end of the second edge 32 is connected to the initial end of the third tilted edge 21*b*, in other words the cutting edges 31, 32, 21*b* are adjoining to each other (FIGS. 6B and 6C). In other words, the tab formation part 69 includes a horizontal cutting edge 32 parallel to the plane P and two oblique cutting edges 21*b*, 31 having a respective tilt opposite from each other, the horizontal cutting edge 32 and the oblique cutting edges 21*b*, 31 are continuously connected to each other.

The tab formation part 69 is matched by the tab portion 79 on the side wall 70. In other words, the tab formation part 69 is arranged for making notches on the side wall 70 to determine, in use, the tab portion 79 on the main body 71. The tab formation part 69 extends for example for about 5% to 10% of the length of the knife 100.

The knife 100 may include in particular a further connection formation part 64*b*. The further connection formation part 64*b* extends for example for about 10% to 15% of the length of the knife 100. The further connection formation part 64*b* is matched by the relative strap 74*b*. The further connection formation part 64*b* may in turn include a further connection formation central part 67*b* in which the second cutting edge 22*b* lying on the second plane, overlaps the first cutting edge 23*b* along the vertical axis Z, at a height higher than the first cutting edge 23*b*. The further connection formation central part 67*b* extends for instance for about 3/5 of the further connection formation part 64*b*. The further connection formation central part 67*b* is matched by the corresponding central portion of the strap 77*b*. The further connection formation part 64*b* may in turn include in particular a further first joint formation part 65*b*, located in particular upstream of the further connection formation central part 67*b*, including the third cutting edge with a negative tilt 24*b*. The initial end of the third tilted cutting edge 21*b* is connected to the final end of the fourth cutting edge 32 and the final end of the third tilted cutting edge 21*b* is connected to the initial end of the first cutting edge 23*b*, in other words the cutting edges 32, 21*b* and 23*b* are adjoining to each other (FIG. 6B). The further first joint formation part 65*b* extends for instance for about ⅓ of the further connection formation part 64*b*. The further first joint formation part 65*b* is matched by the respective joint portion 75*b* on the cap 7. The further connection formation part 64*b* may in turn include a further second joint formation part 66*b*, located in particular downstream of the further connection formation central part 67*b*, including the third cutting edge with a negative tilt 24*b*. The initial end of the third tilted cutting edge 24*b* is connected to the final end of the second cutting edge 22*b* and the final end of the third tilted cutting edge 24*b* is connected to the initial end of the first cutting edge 15, in other words the cutting edges 22*b*, 24*b* and 15 are adjoining to each other (FIG. 6A). The further second joint formation part 66*b* extends for instance for about ⅓ of the further connection formation part 64*b*. The further second joint formation part 66*b* is matched by the respective joint portion 76*b* on the cap 7.

The knife 100 may include in particular a still further opening formation part 68*c*, including the first cutting edge 15 lying on the first plane. The final end of the cutting edge with a negative tilt 24*b* is connected to the initial end of the first cutting edge 15 (FIG. 6A) lying on the first plane, which extends for instance for 10% of the length of the knife 100 along the advancement direction T. The still further opening formation part 68*c* is matched by the respective intended detachment line 78*c*.

Referring again to FIG. 3, the knife 100 may include in particular a tooth formation part 68*d* located in particular downstream of the opening formation part 68*a*, and upstream of the strap formation part 64*a*. The tooth formation part 68*d* may include in particular the third cutting edge with a positive tilt 12 and the second cutting edge 13. The final end of the third tilted cutting edge 12 is connected to the initial end of the second cutting edge 13, in other words the cutting edges 12 and 13 are adjoining to each other (FIG. 6F). The tooth formation part 68*d* is arranged in particular for connecting the opening formation part 68*a* to the joint part 65*a*, such that the opening formation part 68*a* and 68*b* lie on the same first plane. The tooth formation part 68*d* is matched by the respective tooth portion 78*d* on the cap 7.

It must be noted that, as the arrangement of cutting edges 60 is suitable for cutting a substantially cylindrical-shaped object, it may have a different order of the parts of the arrangement of cutting edges 60 above-described as far as the sequence is fulfilled; for instance the opening formation parts 68*a* and 68*c* of the arrangement of cutting edges 60 may be incorporated in a single opening formation part and may be arranged together as initial or final part of the arrangement of cutting edges 60 along the advancement direction T.

Within the context of the invention, the terms "initial/final", "starts/ends" and "beginning/end", "upstream/downstream" refer to the order of the projections of the ends of the cutting edges along the advancement direction T, or, in the case of vertical cutting edges, to the order of such ends along an increasing height direction of the vertical axis Z.

As mentioned, the arrangement of cutting edges 60 may have in particular cutting edges adjoining to each other and cutting edges spaced apart from other. Where cutting edges "adjoining" to each other means that a blade of a respective cutting edge and another blade of another respective cutting edge are substantially connected continuously to one another in a direction parallel to the direction T; the cutting edges are "spaced apart" from each other when a blade of a respective cutting edge and another blade of another respective cutting edge are substantially separated from each other in a direction parallel to the direction T. Referring in particular to FIG. 1-3, the knife 100 has in particular a first group of cutting edges including the cutting edges 11, 12, 13, 21*a*, 23*a* adjoining to each other, a second group of cutting edges including the cutting edges 22*a*, 24*a*, 14, 31, 32, 21*b*, 23*b* adjoining to each other, and a third group of cutting edges 22*b*, 24*b*, 15 adjoining to each other; those groups being spaced apart from each other. As shown in FIG. 2, the second cutting protrusion includes a second blade having a root 82 and second cutting edge 22*a* and the third cutting protrusion includes a third blade having a root 83 and third cutting edge 24*a*. A cutout 80 in the second blade spaces apart the roots 82 and 83 of respectively the second blade and the third blade.

Figure 8:
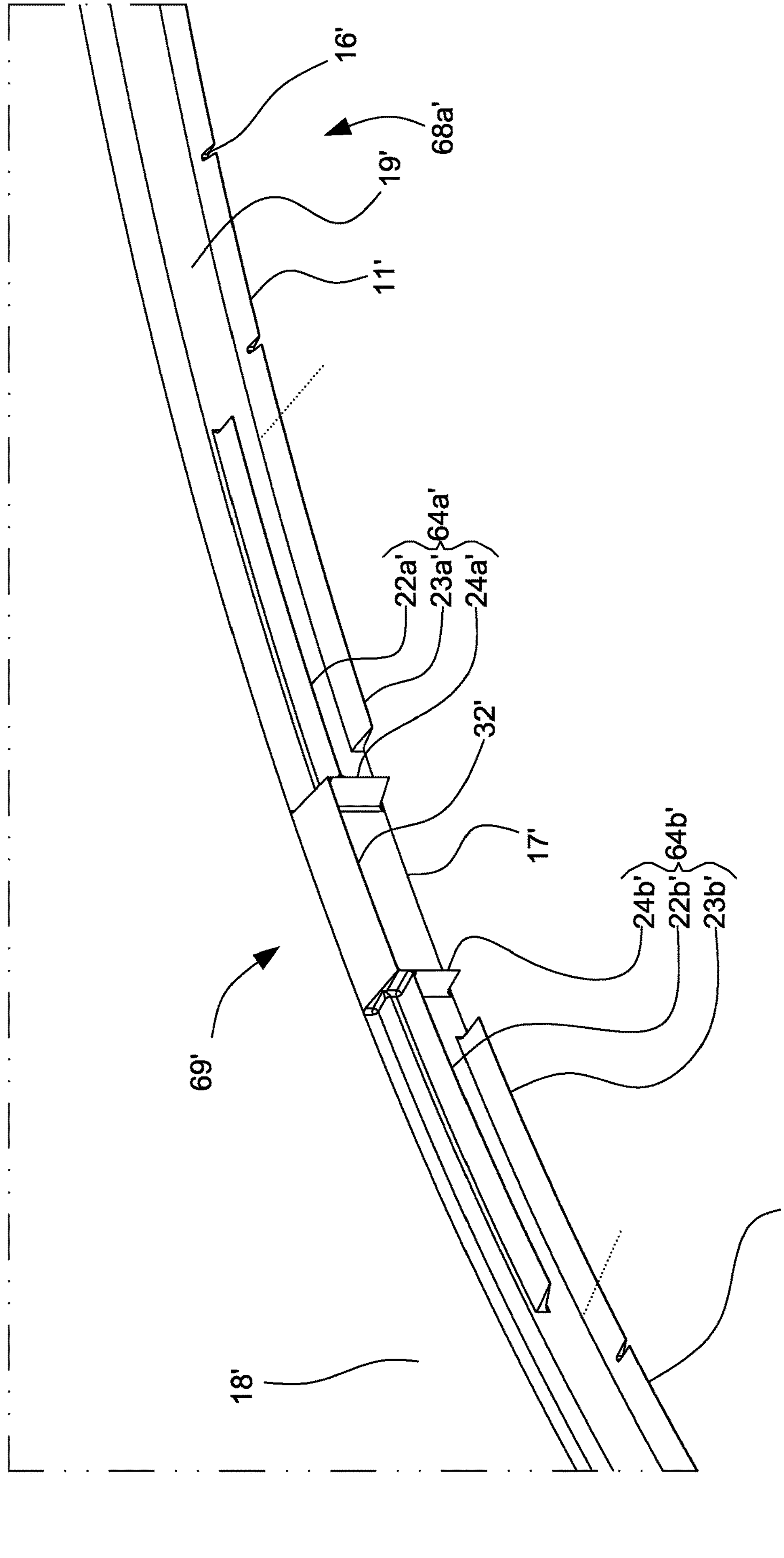
FIG. 8 is a detail of FIG. 7, showing cutting protrusions of the knife.

Referring to the FIGS. 7, 8, the knife 100' has in particular a plate structure shape, i.e., it extends mainly along two main dimensions with respect to a third transversal dimension (thickness), and has a plan shape which is in particular rectangle like (FIG. 5). The main dimensions may in particular lie on the plane P, the transversal dimension may lie in particular along the vertical axis Z and substantially orthogonal to the plane P. The knife 100' has two plane faces, substantially parallel to each other and to the plane P: a lower face 17' an upper face 18'.

The knife 100', in a peripheral region 19', includes in particular a first cutting protrusion which extends parallel to the horizontal plane P. Such first cutting protrusion is arranged in particular for making circumferential notches on the side wall 70 at a first height on the vertical axis Z to define a tamper-evident ring 72 in the cap 7.

The first cutting protrusion includes in particular a plurality of first cutting edges 11', 15', 23*a*', 23*b*'. Those cutting edges 11', 15', 23*a*', 23*b*' may be in particular spaced apart from or adjoining to each other along the advancement direction T. Referring in particular to the second embodiment, in the knife 100', the first cutting edges 11' and 23*a*' are adjoining to each other, the first cutting edges 23*b*', 15' are adjoining to each other, while the first cutting edges 23*a*', 23*b*' are spaced apart from each other.

The first cutting edges 11', 15', 23*a*', 23*b*', may lie on a same plane that is parallel to plane P, therefore the first protrusion acts as a horizontal cutting tool. The first plane is at a given height with respect to the plane P, on a vertical axis Z, orthogonal to the plane P. Joining the plurality of the first cutting edges 11', 15', 23*a*', 23*b*', a first substantially arc-of-circumference curved line is obtained, the centre of which is positioned outside the knife 100' on an axis substantially orthogonal to the plane P. The first cutting protrusion is arranged in particular for contributing to form straps 74*a*', 74*b*' on the side wall 70, together with the second cutting protrusion and third cutting protrusion, and makes the incisions and cuts that separate the main body 71 from the tamper-evident band 72.

The knife 100', in the peripheral region 19', includes in particular a second cutting protrusion which extends parallel to the horizontal plane P. Such second cutting protrusion overlaps in particular at least partially to the first cutting protrusion for a tract of a pre-set length measured along the advancement direction T. Such second cutting protrusion is in particular arranged for making circumferential notches on the side wall 70 at a second height on the vertical axis Z and for determining in use, together with the first cutting protrusion, the connection portions connecting the tamper-evident ring 72 and the main body 70.

The second cutting edge includes in particular a plurality of second cutting edges 22*a*', 22*b*', such second cutting edges 22*a*', 22*b*', may be in particular spaced apart from each other along the advancement direction T.

The second cutting edges 22*a*', 22*b*' lie on a same second plane that is parallel to plane P, therefore the second protrusion acts as a horizontal cutting tool. Joining the plurality of the second cutting edges 22*a*', 22*b*', a second substantially arc-of-circumference curved line is obtained, the centre of which is positioned outside the knife 100' on an axis substantially orthogonal to the plane P. The second cutting protrusion is arranged in particular for contributing to determine, in use, the straps 74*a*', 74*b*', in particular central portions 77*a*', 77*b*', of the straps 74*a*', 74*b*', on the side wall 70, together with the first cutting protrusion.

The knife 100', in the peripheral region 19', includes in particular a third cutting protrusion arranged for making oblique and/or vertical notches on the side wall 70. Such third cutting protrusion is arranged in particular for contributing to determine, in use, together with the first cutting protrusion and/or second cutting protrusion, the straps 74*a*', 74*b*', in particular joint portions 76*a*', 76*b*', of the straps 74*a*', 74*b*' and together with a fourth cutting protrusion a tab portion 79' on the side wall 70.

The third cutting edge includes in particular a plurality of third vertical cutting edges 24*a*', 24*b*', such third cutting edges 24*a*', 24*b*', may be in particular spaced apart from each other along the advancement direction T.

Figure 9:
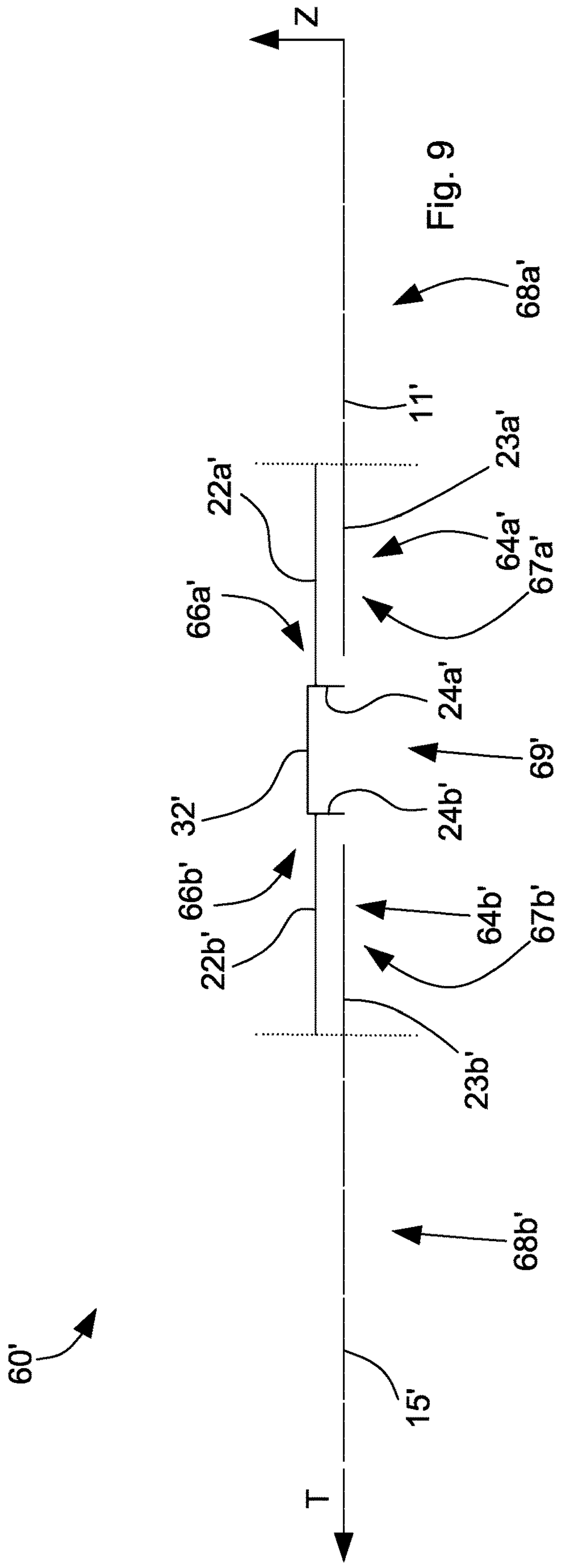
FIG. 9 is a schematic view of a blade arrangement of the knife of FIG. 7.

Referring to FIGS. 7-9, the knife 100', in the peripheral region 19', includes in particular a fourth cutting protrusion which extends parallel to the horizontal plane P. Such fourth cutting protrusion is arranged in particular for making circumferential notches on the side wall 70 at a third height on the vertical axis Z and for determining, in use, together with the third cutting protrusion, the tab portion 79' on the side wall 70.

The fourth cutting protrusion includes in particular a fourth cutting edge 32' which is horizontal. The fourth cutting edge 32', or at least a point thereof, is on a fourth substantially arc-of-circumference curve, the centre of which is positioned outside the knife 100', on a fourth axis substantially orthogonal to the plane P. The fourth curve, and thus the fourth cutting edge 32', lies on a third plane at a height equal to or greater than second cutting edges 22*a*', 22*b*'. The fourth cutting edge 32' has a longitudinal extension smaller than the circumference of the side wall 70 of the cap to be processed.

In the knife 100', moreover:

the first axis of the first curve defined by the first cutting edges 11', 23*a*', 23*b*', 15' of the first cutting protrusion;

the second axis of the second curve defined by the second cutting edges 22*a*', 22*b*', of the second cutting protrusion;

the third axis of the third curve defined by the peripheral region 19'; and the fourth axis of the fourth curve defined by the fourth cutting edge 32';

are substantially coincident with each other.

In the knife 100', furthermore, the relative position between:

the first cutting edges 11', 23*a*', 23*b*', 15';

the second cutting edges 22*a*', 22*b'*;

the third cutting edges 24*a*', 24*b*'; and the fourth cutting edge 32';

defines an arrangement of cutting edges 60' of the knife 100'.

As already mentioned, the first cutting edges 11', 23*a*', 23*b*', 15' and the second cutting edges 22*a*', 22*b*', and the fourth cutting edge 32' are arranged at different heights from each other along the vertical axis Z, i.e., at different distances from the plane P.

Referring to FIGS. 10A and 10B, depending on the relative position between the cutting edges of the cutting tools, the knife 100' may form on the side wall 70 of the cap 7 different parts.

The knife 100' may form on the side wall 70 in particular one or more intended detachment lines 78*a*', 78*b*', arranged on the same plane and obtained by penetrating the first cutting edges 11', 15' through the thickness of the side wall 70.

The knife 100' may form on the side wall 70 in particular one or more connection portions, or straps 74*a*', 74*b*'. Each strap 74*a*', 74*b*' may in turn include in particular a central portion 77*a*', 77*b*', obtained by through penetration of the first cutting edges 23*a*', 23*b*' and the second cutting edges 22*a*', 22*b*'. Each strap 74*a*', 74*b*' may in turn include in particular a second joint portion 76*a*', 76*b*', obtained by through penetrating of the third vertical cutting edges 24*a*', 24*b*', arranged in particular for connecting the connection portion 74*a*' to the main body 71.

The knife 100' may form a tab portion 79' on the side wall 70, due to the trough penetration of the third vertical cutting edges 24*a*', 24*b*, and of the fourth cutting edge 32', such tab portion 79' is arranged in particular for maintaining the main body 71 overturned with respect to the tamper-evident ring 72 once the container is open.

In detail, referring to FIG. 9, along the advancement direction T, the knife 100' may include in particular an opening formation part 68*a*', including the first cutting edge 11' lying on the first plane parallel to the plane P. The final end of the first cutting edge 11' is connected to the initial end of the first cutting edge 23*a*', in other words the cutting edges 23*a*' and 11' are adjoining to each other (in FIGS. 8 and 9 the distinction between such cutting edges is represented by a dotted line). The opening formation part 68*a*' extends for example for about 30% and 45% of the length of the knife 100'. The opening formation part 68*a*' is matched on the cap 7 by the relative intended detachment line 78*a*' (FIG. 10A, 10B). In other words, the opening formation part 68*a*' is in particular arranged for making circumferential notches on the side wall 70 at a first height on the vertical axis Z substantially parallel to the rotation axis R to define the tamper-evident ring 72 and the main body 71.

The knife 100' may include in particular a connection formation part 64*a*'. The connection formation part 64*a*' occupies a region of the knife 100' extending for instance between 10% and 20% of the length of the knife 100'. The connection formation part 64*a*' corresponds to the strap 74*a*' on the cap 7. In other words, the connection formation part 64*a*' is arranged in particular for making circumferential notches on the side wall 70 in order to determine, in use, the connection portion 74*a*', connecting the tamper-evident ring 72 and the main body 71. The connection formation part 64*a*' may in turn include in particular a connection formation central part 67*a*', in which the first cutting edge 23*a*' overlaps along the vertical axis Z the second cutting edge 22*a*' lying on the second plane, i.e., at a height higher than the first cutting edge 23*a*'. The second cutting edge 22*a*' is arranged in particular perpendicular to the third vertical cutting edge 24*a*'. The connection formation central part 67*a*' extends for instance for about ⅚ of the connection formation part 64*a*'.

The connection formation central part 67*a*' is matched by a corresponding central portion of the strap 77*a*'. The connection formation part 64*a*' may in turn include in particular a joint formation part 66*a*', located in particular downstream of the connection formation central part 67*a*', including the third vertical cutting edge 24*a*'. The joint formation part 66*a*' may include in particular a final tract of the second cutting edge 22*a*'. The final end of the second cutting edge 22*a*' is connected to an intermediate tract of the third cutting edge 24*a*', such intermediate tract being located in particular near the final end of the third vertical cutting edge 24*a*'. The second cutting edge 22*a*' is arranged in particular perpendicular to the third vertical cutting edge 24*a*'. The joint formation part 66*a*' extends for instance for about ⅙ of the connection formation part 64*a*'. The joint formation part 66*a*' is matched by the respective joint portion 76*a*' on the cap 7. In other words, the joint formation part 66*a*' is arranged in particular for determining in use the joint portion 76*a'*.

The knife 100' may in particular include a tab formation part 69', including the third cutting edge 24*a*', the fourth cutting edge 32' and the third vertical cutting edge 24*b*'. The initial end of the fourth cutting edge 32' is connected to the final end of the third cutting edge 24*a*' and the final end of the fourth edge 32' is connected to the initial end of the third vertical cutting edge 24*b*', so that the fourth cutting edge 32' is orthogonal to the third vertical cutting edges 24*a*' and 24*b*'. The final tracts of the third vertical cutting edges 24*a*' and 24*b*' are respectively connected to the final end of the second cutting edge 22*a*' and to the initial end of the second cutting edge 22*b*', so that the third vertical cutting edges 24*a*' and 24*b*' are orthogonal to the second cutting edges 22*a*' and 22*b*'. In other words, the tab formation part 69' includes the horizontal cutting edge 32' parallel to the plane P and two vertical cutting edges 24*a*', 24*b*' parallel to each other and orthogonal to the plane P, the horizontal cutting edge 32' and the vertical cutting edges 24*a*', 24*b*' are connected continuously to each other. The tab formation part 69' is matched by the tab portion 79' on the side wall 70. In other words, the tab formation part 69' is arranged for making notches on the side wall 70 to determine in use, the tab portion 79' on the main body 71. The opening formation part 69' extends for example for about 10% of the length of the knife 100'.

The knife 100' may include in particular a further connection formation part 64*b*'. The further opening formation part 64*b*' extends for example for about 10% to 20% of the length of the knife 100. The further opening formation part 64*b*' is matched by the relative strap 74*b*'. The further connection formation part 64*b*' may in turn include in particular a further connection formation central part 67*b*' in which the first cutting edge 23*b*' overlaps the second cutting edge 22*b*' along the vertical axis Z, i.e., at a height higher than the first cutting edge 23*b*'. The further connection formation central part 67*b*' extends for instance for about ⅚ of the further connection formation part 64*b*'. The further connection formation central part 67*b*' is matched by the corresponding central portion of the strap 77*b*'. The connection formation part 64*b*' may in turn include in particular a further joint formation part 66*b*' located in particular upstream of the further connection formation central part 67*b*' including the third vertical cutting edge 24*b*'. The further joint formation part 66*b*' may include in particular an initial tract of the second cutting edge 22*b*'. The initial end of the second cutting edge 22*b*' is connected to an intermediate tract of the third cutting edge 24*b*', in particular located in particular near the final end of the third vertical cutting edge 24*b*'. The second cutting edge 22*b*' is arranged in particular perpendicular to the third vertical cutting edge 24*b*'. The further joint formation part 66*b*' extends for instance for about ⅓ of the further connection formation part 64*b*'. The further joint formation part 66*b*' is matched by the respective joint portion 76*b*' on the cap 7.

The knife 100' may include in particular a further opening formation part 68*b*', including the first cutting edge 15' lying on the first plane parallel to the plane P. The initial end of the first cutting edge 15' is connected to the final end of the first cutting edge 23*b*', in other words the cutting edges 23*b*' and 15' are adjoining between each other (in FIGS. 8 and 9 the distinction between such cutting edges is represented by a dotted line). The opening formation part 68*b*' extends for example for about 30 to 45% of the length of the knife 100'. The opening formation part 68*b*' is matched on the cap 7 by the relative intended detachment line 78*b*' (FIGS. 10A, 10B).

The arrangement of cutting edges 60' may have in particular cutting edges adjoining to each other and cutting edges spaced apart from each other.

Referring to FIGS. 7-9, the knife 100' has in particular one first group of cutting edges including the cutting edges 11', 23*a*' connected to each other, one second group of cutting edges including the cutting edges 22*a*', 24*a*', 32', 24*b*', 22*b*' connected to one another, and a third group of cutting edges 23*b*', 15' connected to each other; the groups being spaced apart from each other.

The knife 100, 100' may be in particular made in a single piece, it may be in particular obtained from a solid piece by a cutting and/or milling operation.

The knife 100, 100' may for example be obtained from a metal plate, a peripheral region of which may be processed with suitable tools to obtain the cutting protrusions, the blades and the respective cutting edges.

Thanks to the knife conformation 100, 100', it is possible to remove the knife 100, 100' and replace it with a different knife to obtain a different shape of the connection or strap portions 74*a*, 74*b*. This simplifies the cutting apparatuses and reduces downtimes to equip the cutting apparatus with a different knife.

The illustrated examples show a cap notched with two straps: the first example shows two straps both tilted with a negative tilt with respect to the advancement direction T, the second example shows two straps, one tilted with a negative tilt and one tilted with a positive tilt with respect to the advancement direction T, as visible in the opening configuration D of the cap. A person skilled in the art would have no difficulty in modifying the number and arrangement of cutting edges of the knife 100, 100' to create more than two straps on the cap, such as three or four straps, tilted according to negative and/or positive tilts according to various combinations.

It is possible to provide a number and an arrangement of cutting edges having positive and negative tilts combined to form three straps arranged as tilted with the same tilt or a strap with a given tilt and two consecutive straps with opposite tilt or three straps with alternating tilts. It is also possible to provide another different arrangement of cutting edges, the positive and negative tilt combination of which may form four straps all tilted with the same tilt or groups of two straps tilted as opposite to each other or four straps tilted with alternating tilts or three consecutive tilted straps with the same tilt and a tilted strap with the opposite tilt. It is also possible to provide another arrangement of cutting edges, having positive or negative tilts combined to form a plurality of straps, in particular more than four, connecting the tamper-evident ring 72 and the main body 71. In other words, the arrangement of cutting edges 60, 60' may include further connection formation parts arranged for determining, in use a plurality of connection portions connecting said tamper-evident ring 72 and the main body 71.

It is also possible to provide a partial arrangement of cutting edges enabling to form a single strap on the side wall of the cap 7. It is possible to provide in particular a partial arrangement of cutting edges including a plurality of edges of the arrangement of cutting edges 60, such as the adjoining cutting edges 13, 21*a*, 23*a* and the adjoining cutting edges 22*a*, 24*a*, 14, to make a single strap, such as the strap 74*a*. In alternative, it is possible to provide in particular a partial arrangement of cutting edges including a plurality of edges of the arrangement of cutting edges 60, such as the adjoining cutting edges 32, 21*b*, 23*b* and the adjoining cutting edges 22*b*, 24*b*, 15, to make a single strap, such as the strap 74*b*.

It is possible to provide in particular a partial arrangement of cutting edges including a plurality of edges of the arrangement of cutting edges 60', such as the adjoining cutting edges 11', 23*a'* and the adjoining cutting edges 22*a'*, 24', to make a single strap, such as the strap 74*a'*. In alternative, it is possible to provide in particular a partial arrangement of cutting edges including a plurality of edges of the arrangement of cutting edges 60', such as the adjoining cutting edges 15, 23*b'* and the cutting edges 22*b'*, 24*b'*, to make a single strap, such as the strap 74*b'*.

In order to obtain three or four connection portions—or straps, connecting the tamper-evident ring 72 and the side wall 70—in addition to the tilted cutting edges 21*a*, 21*b*, 24*a*, 24*b* or the vertical edges 24*a'*, 24*b'* in the third cutting protrusion, further cutting edges may be present arranged so as to determine, in use, the three connection portions or the four connection portions.

In alternative or in addition to the further cutting edges in the third cutting protrusion, to obtain three connection portions or four connection portions, the knife 100, 100' may include in its structure further cutting protrusions arranged to cooperate with the first cutting protrusion, the second cutting protrusion, the third cutting protrusion, and, if present, the further cutting edges to determine, in use, the three connection portions or the four connection portions connecting the tamper-evident ring 72 and the side wall 70.

The arrangement of the cutting edges 60, 60' may further include further tab formation parts arranged for determining, in use, a plurality of tab portions to keep the main body 71 overturned with respect to the tamper-evident ring 72 once the container is open. The arrangement of the cutting edges 60, 60' may in particular include further tab formation parts to determine, in use, two tab portions or three tab portions.

The invention claimed is:

1. A knife arranged for being fitted in a cutting apparatus for obtaining incision lines and notches on a cap made of plastics intended for closing a container, said knife being suitable for making notches and incisions on a side wall of said cap when said cap, by rotating around a rotation axis, is moved along a path for interacting with said knife in an advancement direction, said knife including an arrangement of blades that project from a peripheral region of said knife from a respective root connected to the peripheral region to a respective cutting edge, said arrangement of blades including:

at least one opening formation part that extends parallel to a horizontal plane orthogonal to said rotation axis, said at least one opening formation part including a cutting edge arranged for making at least one circumferential notch on said side wall at a first height on a vertical axis that is substantially parallel to said rotation axis to define a tamper-evident ring and a main body in said cap;

at least one connection formation part arranged for providing at least one notch on said side wall to determine on said cap at least one connection portion connecting said tamper-evident ring and said main body, the at least one connection formation part of the knife including:

a first blade with at least one first cutting edge parallel to said plane and arranged on said first height;

a second blade having a root and a second cutting edge parallel to said plane and arranged on a second height that is greater than said first height on said vertical axis, said second cutting edge being at least partially superimposed on said first cutting edge to define a central portion of said at least one connection portion; and a third blade having a root and a third cutting edge arranged to make oblique or vertical notches on said side wall, said third cutting edge extending between said first height and said second height, an initial end of said third cutting edge being integrally connected to a final end of said second cutting edge and a final end of said third cutting edge being integrally connected to an initial end of a further first cutting edge other than said at least one first cutting edge;

wherein said knife consists of a single piece including said arrangement of blades; and wherein a cutout in said second blade spaces apart said respective roots of said second blade and said third blade.

2. The knife according to claim 1, wherein said arrangement of cutting blades further includes a further connection formation part arranged for providing at least one notch on said side wall to define a further connection portion on said cap connecting said tamper-evident ring and said main body, said further connection formation part of the knife including:

a still further first cutting edge, parallel to said plane and arranged on said first height;

a further second cutting edge parallel to said plane and arranged on said second height, said further second cutting edge being at least partially superimposed on said still further first cutting edge to define a central portion of said further connection portion; and a further third cutting edge arranged to make oblique or vertical notches on said side wall, said further third cutting edge extending between said first height and said second height.

3. The knife according claim 1, wherein said arrangement of cutting blades further includes a tab formation part arranged for making at least one notch on said side wall for determining in use a tab portion in said main body, said tab portion being arranged for maintaining said main body overturned with respect to said tamper-evident ring once said container is open.

4. The knife according to claim 3, wherein said tab formation part includes a horizontal cutting edge parallel to said plane and two oblique cutting edges having a respective tilt opposite one another, said horizontal cutting edge and said oblique cutting edges being continuously connected to one another, said respective tilt referring to a through plane for said vertical axis and tangent to said advancement direction of said cap.

5. The knife according to claim 3, wherein said tab formation part includes a horizontal cutting edge parallel to said plane and two vertical cutting edges parallel to one another and orthogonal to said plane, said horizontal cutting edge and said vertical cutting edges being continuously connected to one another.

6. The knife according to claim 1, wherein said arrangement of cutting blades further includes further tab formation parts arranged for determining in use a plurality of tab portions to maintain said main body overturned with respect to said tamper-evident ring once said container is open.

7. The knife according to claim 1, wherein said arrangement of cutting blades includes two tilted cutting edges having tilts that are different from one another, said tilt referring to a reference plane passing through said vertical axis and tangent to said advancement direction of said cap.

* * * * *